US008151186B1

(12) United States Patent
Spasojevic et al.

(10) Patent No.: US 8,151,186 B1
(45) Date of Patent: *Apr. 3, 2012

(54) COMPARING TEXT PAGES USING IMAGE FEATURES BASED ON WORD POSITIONS

(75) Inventors: Nemanja L. Spasojevic, San Francisco, CA (US); Guillaume Poncin, San Francisco, CA (US); Dan S. Bloomberg, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/228,352

(22) Filed: Sep. 8, 2011

Related U.S. Application Data

(60) Provisional application No. 61/451,920, filed on Mar. 11, 2011.

(51) Int. Cl.
*G06F 15/177* (2006.01)
(52) U.S. Cl. ....................................................... 715/243
(58) Field of Classification Search .................... 715/243
See application file for complete search history.

(56) References Cited

U.S. PATENT DOCUMENTS

| 5,926,812 | A  | * | 7/1999 | Hilsenrath et al. | 707/737 |
| 6,240,409 | B1 | * | 5/2001 | Aiken | 1/1 |
| 2003/0014445 | A1 | * | 1/2003 | Formanek et al. | 707/526 |
| 2003/0171910 | A1 | * | 9/2003 | Abir | 704/1 |

OTHER PUBLICATIONS

Bay, H., et al., "SURF: Speeded Up Robust Features," in ECCV, 2006, pp. 1-14, can be retrieved at <URL: http://www.vision.ee.ethz.ch/~surf/eccv06.pdf>.
Bloomberg, D., et al., "Document Image Applications," Chapter 46, Livre Hermes Morphologie Mathmatique, pp. 1-12, can be retrieved at <URL: http://www.leptonica.org/papers/dia.pdf>.
Ke, Y., et al., "PCA-SIFT: A More Distinctive Representation for Local Image Descriptors," CVPRr'04, 2004, 8 Pages, can be retrieved at <URL: http://www.cs.cmu.edu/~rahuls/pub/cvpr2004-keypoint-rahuls.pdf>.
Liu, Q., et al., "High Accuracy and Language Independent Document Retrieval with a Fast Invariant Transform," International Conference on Multimedia Computing and Systems (ICMCS)/International Conference on Multimedia and Expo (ICME), 2009, pp. 386-389, can be retrieved at <URL: http://www.fxpal.com/publications/FXPAL-PR-09-505.pdf>.
Lowe, D., "Distinctive Image Features from Scale-Invariant Keypoints," International Journal of Computer Vision, 2004, pp. 91-110, vol. 60, No. 2.

(Continued)

*Primary Examiner* — Doug Hutton, Jr.
*Assistant Examiner* — Andrew McIntosh
(74) *Attorney, Agent, or Firm* — Fenwick & West LLP

(57) ABSTRACT

A signature for a page of text is generated. The signature serves as an identifier of the text page. Positions of words in a text page are determined. Positions of multiple second words in the text page are determined relative to the position of a first word in the text page. A signature value is generated that describes the second word positions relative to the first word position. The signature value is stored. Additional signatures for the text page can be generated, each signature describing positions of other words in the text page relative to a word in the text page for which the signature is being generated. The signatures can be used to compare the text page to another text page and generate a measure of similarity that describes the result of the comparison.

20 Claims, 5 Drawing Sheets

OTHER PUBLICATIONS

Lu, S., et al., "Document Image Retrieval through Word Shape Coding," Apr. 10, 2008, pp. 1-16, [Retrieved from www.citeseerx.ist.psu.edu on Sep. 8, 2011] Retrieved from the internet <URL: http://www.comp.nus.edu.sg/~tancl/Papers/PAMI/LuSJ2008/document%20annotation%20and%20retrieval%20(final%20manuscript).pdf>.

Nakai, T., et al., "Hashing with Local Combinations of Feature Points and its Application to Camera-Based Document Image Retrieval," Proc. CBDAR05, 2005, pp. 87-94.

Webpage for Leptonica, Leptonica, last updated Mar. 14, 2011, 3 pages [online][retrieved on Sep. 8, 2011] retrieved from the internet <URL: http://www.leptonica.org/>.

* cited by examiner

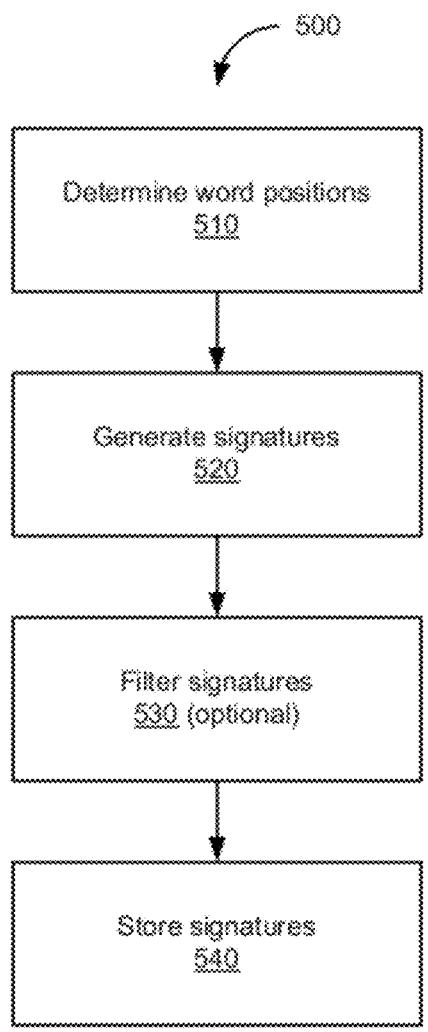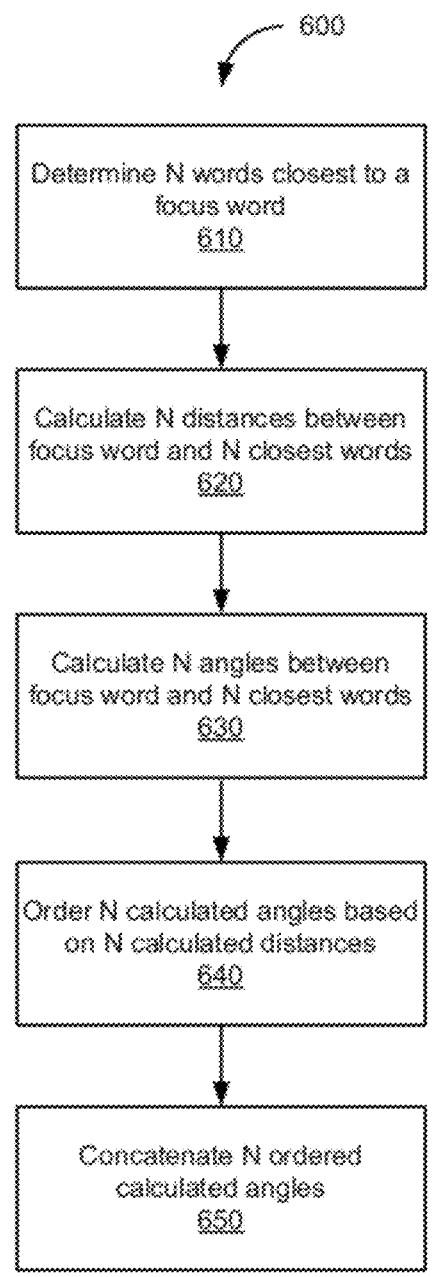
FIG. 5
FIG. 6

COMPARING TEXT PAGES USING IMAGE FEATURES BASED ON WORD POSITIONS

RELATED APPLICATION

This application claims the benefit of U.S. Provisional Application No. 61/451,920, filed on Mar. 11, 2011, entitled "Matching Document Images Using Discrete Point Based Signatures."

BACKGROUND

1. Technical Field

The present invention generally relates to the field of image analysis and in particular to comparing pages of text using image features based on word positions.

2. Background Information

Pages of text can be compared using image features. Image feature extraction is a well-studied problem. Many techniques perform well at point-matching across images and image lookup from a database. However, these techniques do not perform well on repetitive patterns, such as text in document images. In addition, these techniques extract thousands of features per image and match features using nearest neighbor search, which requires sophisticated indexing mechanisms.

Image features can make use of optical character recognition (OCR). Image features based on text that has been subjected to OCR processing typically work well. However, this technique requires good quality OCR, which is not always available and can be very costly. This technique is also language-dependent and performs poorly for certain languages (e.g., non-Western languages such as Chinese and Arabic).

Therefore, tasks that require comparison of document pages, such as search and retrieval, do not work as well as they should.

SUMMARY

The above and other issues are addressed by a computer-implemented method, non-transitory computer-readable storage medium, and computer system for generating a signature for a page of text. The signature serves as an identifier of the text page. An embodiment of the method comprises determining positions of words in a text page. The method further comprises determining positions of multiple second words in the text page relative to the position of a first word in the text page and generating a signature value that describes the second word positions relative to the first word position.

An embodiment of the medium stores executable computer program instructions for generating a signature for a page of text. The signature serves as an identifier of the text page. The instructions determine positions of words in a text page. The instructions further determine positions of multiple second words in the text page relative to the position of a first word in the text page and generate a signature value that describes the second word positions relative to the first word position.

An embodiment of the computer system for generating a signature for a page of text comprises at least one non-transitory computer-readable storage medium storing executable computer program instructions. The instructions comprise instructions for determining positions of words in a text page. The instructions further determine positions of multiple second words in the text page relative to the position of a first word in the text page and generate a signature value that describes the second word positions relative to the first word position.

BRIEF DESCRIPTION OF THE DRAWINGS

FIG. 5 is a flowchart illustrating a method of analyzing a text page according to one embodiment.

FIG. 6 is a flowchart illustrating a method of generating a signature for a word within a text page according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
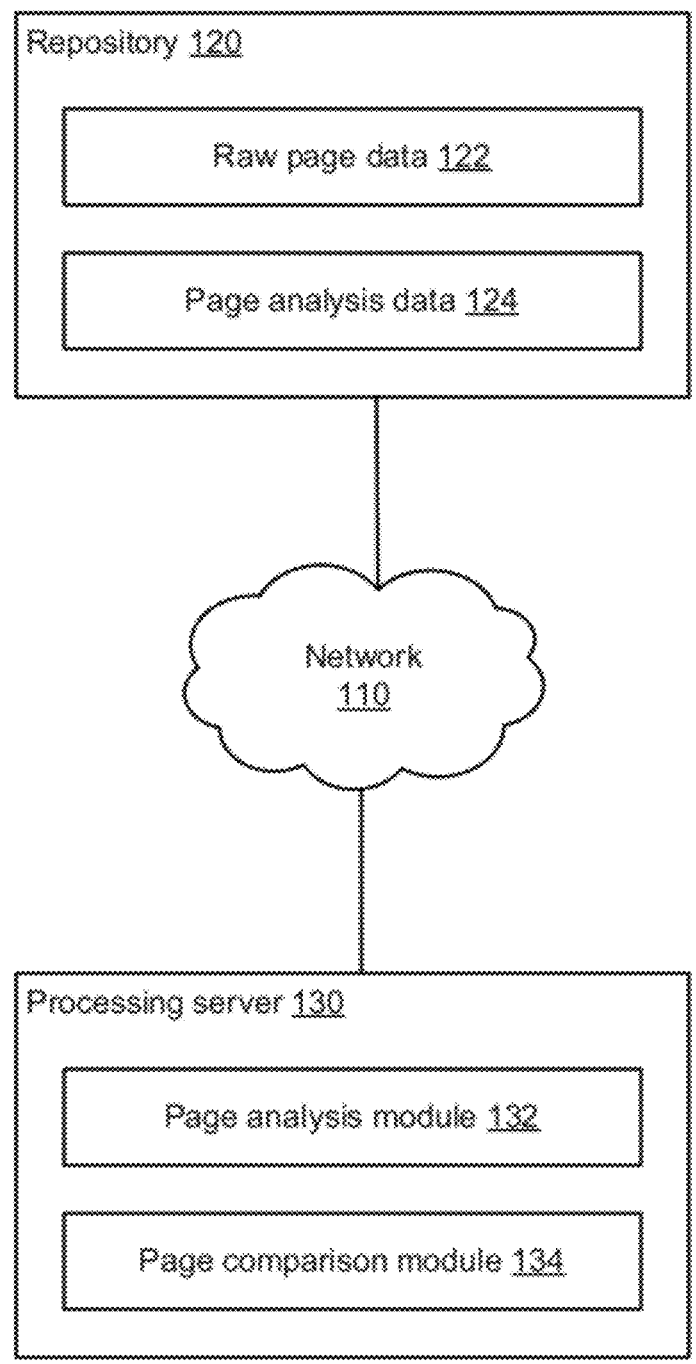
FIG. 1 is a high-level block diagram illustrating an environment for comparing text pages according to one embodiment.

FIG. 1 is a high-level block diagram illustrating an environment 100 for comparing text pages according to one embodiment. The environment 100 may be maintained by an enterprise that analyzes pages of text, such as a corporation, university, or government agency. As shown, the environment 100 includes a network 110, a repository 120, and a processing server 130. While only one of each entity is shown in the embodiment depicted in FIG. 1 for clarity, other embodiments can have multiple repositories 120 and/or processing servers 130.

The network 110 represents the communication pathway between the repository 120 and the processing server 130. In one embodiment, the network 110 uses standard communications technologies and/or protocols and can include the Internet. Thus, the network 110 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 110 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 110 can be represented using technologies and/or formats including image data in binary form (e.g. Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities on the network 110 can use custom and/or dedicated data communications technologies instead of, or in addition to, the ones described above.

The repository 120 is a computer (or set of computers that stores raw page data 122 and page analysis data 124. In one embodiment, the repository 120 includes a server that provides the processing server 130 access to raw page data 122 and page analysis data 124 in response to requests.

Raw page data 122 includes information regarding pages of text. A page of text includes words at fixed locations separated by whitespace. As used herein, the term "word" refers to a string of symbols bordered by white space. A word can include only characters, only numerals, or a combination of characters and numerals. In one embodiment, a "word" does not include any adjoining punctuation marks (e.g., a quotation mark preceding a word or a period following a word) but does include any internal punctuation marks (e.g., an apostrophe or a hyphen).

A page of text can include other content in addition to words, such as images. A page of text can originate in either traditional paper-based format (e.g., as part of a physical book or newspaper) or in digital format (e.g., as part of an electronic file in a format such as Portable Document Format (PDF)).

In one embodiment, information regarding a text page is an image file that represents the appearance of that text page. The image file can be generated by, for example, scanning a sheet of paper from a book. In another embodiment, information regarding a text page includes bounding box information (e.g., location and size) for words in that text page. The bounding box information can be obtained from the text page itself (e.g., if the text page is a PDF file), generated by subjecting the text page to OCR processing, or obtained by performing binary morphology analysis on the text page (e.g., using the Leptonica Image Processing Library, available at http://www.leptonica.org/).

Page analysis data 124 includes sets of image features for various text pages. Each text page is associated with one set of image features. An image feature, referred to herein as a "signature," is a value that describes the positions of various words on a text page. Specifically, a signature is associated with a particular word position on the text page and describes the positions of various words that are near the particular word position. Since one text page includes multiple words at various positions, one text page is associated with multiple signatures (e.g., one signature per word position). These multiple signatures form a set of signatures, which is associated with the text page. Signature generation, including how the value is determined, will be discussed below with reference to FIG. 6. In one embodiment, signatures are discrete (e.g., integer values).

The processing server 130 includes various modules such as a page analysis module 132 for generating sets of signatures and a page comparison module 134 for comparing text pages using sets of signatures. In one embodiment, the processing server 130 includes a computer (or set of computers) that communicates with repository 120 and processes data (e.g., by executing the page analysis module 132 and the page comparison module 134).

In general, the page analysis module 132 generates the sets of signatures in the page analysis data 124. The page analysis module 132 will be discussed below with reference to FIG. 3.

The page comparison module 134 compares a first text page to a second text page. The page comparison module 134 takes as input a first set of signatures associated with the first text page and a second set of signatures associated with the second text page and outputs a measure of similarity between the first text page and second text page. In one embodiment, the measure of similarity is Jaccard similarity. The Jaccard similarity between signatures of two text pages ($J_s$) calculated as:

$$J_s(p_1, p_2) = \frac{\text{number of matching signatures}}{\text{total number of signatures}} = \frac{|S(p_1) \cap S(p_2)|}{|S(p_1) \cup S(p_2)|} \quad (1)$$

where S(p) is the set of signatures from page p, $\cap$ is the intersection operator, and $\cup$ is the union operator. Recall that a signature is a value. So, the set $S(p_1)$ includes a first set of values, and the set $S(p_2)$ includes a second set of values.

Depending on image distortion and word segmentation discrepancy between the first text page and the second text page, the number of matching signatures may be low compared to the total number of signatures. In one embodiment, the page comparison module 134 aligns the two pages and then calculates the Jaccard similarity between bounding boxes of the pages ($J_b$). Specifically, the page comparison module 134 calculates an affine transform from the first text image to the second text image and then uses that transform to align word bounding boxes between the two pages. The page comparison module 134 then calculates how many pairs of bounding boxes match. A pair of bounding boxes (one in the first text image and one in the second text image) is defined as "matching" when the locations of the bounding boxes' centroids are close after the transformation and the bounding boxes have roughly the same size. From the matching box count, the similarity $J_b$ is calculated as:

$$J_b(p_1, p_2) = \frac{|\text{MatchCount}(p_1, p_2)|}{|\text{BoxCount}(p_1) + \text{BoxCount}(p_2) - \text{MatchCount}(p_1, p_2)|} \quad (2)$$

where MatchCount($p_1$, $p_2$) is the number of matching bounding box pairs, BoxCount($p_1$) is the number of bounding boxes in the first text image, and BoxCount($p_2$) is the number of bounding boxes in the second text image.

The similarity measure output by the page comparison module 134 can be used in many situations, such as automatic scanning of traditional paper-based books and document retrieval from low-quality photographs. When traditional paper-based books are scanned automatically (i.e., by a machine), the page images that are produced might be flawed. For example, the page images might be skewed, too dark or too light, or completely unusable (e.g., if the previous sheet of paper was not fully removed or "turned", thereby obscuring the following sheet). The flawed page images make it difficult for both humans and machines to read the text on the page.

One solution is to scan multiple copies of the same book and then generate a new best-possible "book" (i.e., set of page images) that contains the best image for each page, regardless of which traditional paper-based book copy that image came from. The similarity measure described above can be used to detect images of the same page among multiple books. The best (i.e., least flawed) image of that page can then be used in the generated best-possible "book." This best-possible book can then be used instead of the scanned images from the duplicate books.

Another situation in which the similarity measure described above can be used is document retrieval based on a photograph of a page. For example, a user takes a photograph of a book page with his mobile phone and sends the photo to a server. The server determines the book in which that page appears and returns information regarding the book (e.g., a link to an electronic version of the book or an online store selling the book).

In one embodiment, the server operates as follows: The server includes an index of book page images based on OCR bounding boxes. The index maps a signature to a list of tuples (sequences of elements), each of which contains three elements: a book, a page, and a. position. A <book, page, position> tuple indicates a particular position on a particular page of a particular book. At query time, the server processes the received book page image to extract word centroids and then generates signatures. The server looks up each signature in the index and tracks the number of hits (i.e., matching signatures) per book page. The server then determines the book page with the largest number of matching signatures.

Figure 2:
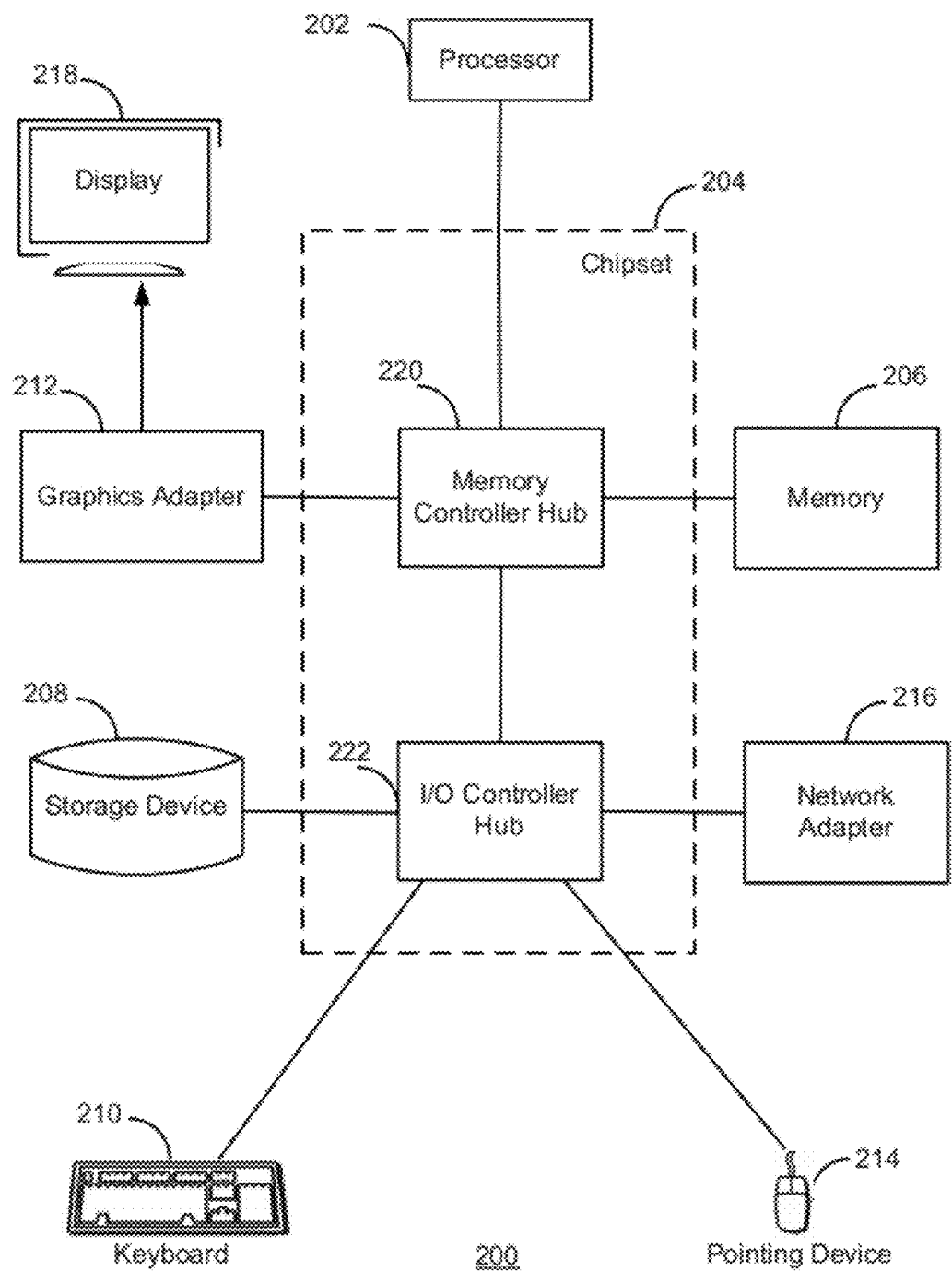
FIG. 2 is a high-level block diagram illustrating an example of a computer for use as a repository and/or a processing server, in accordance with one embodiment.

FIG. 2 is a high-level block diagram illustrating an example of a computer 200 for use as a repository 120 and/or a processing server 130, in accordance with one embodiment. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the repository 120 and/or the processing server 130 can be formed of multiple blade servers and lack a display device, keyboard, and other components.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
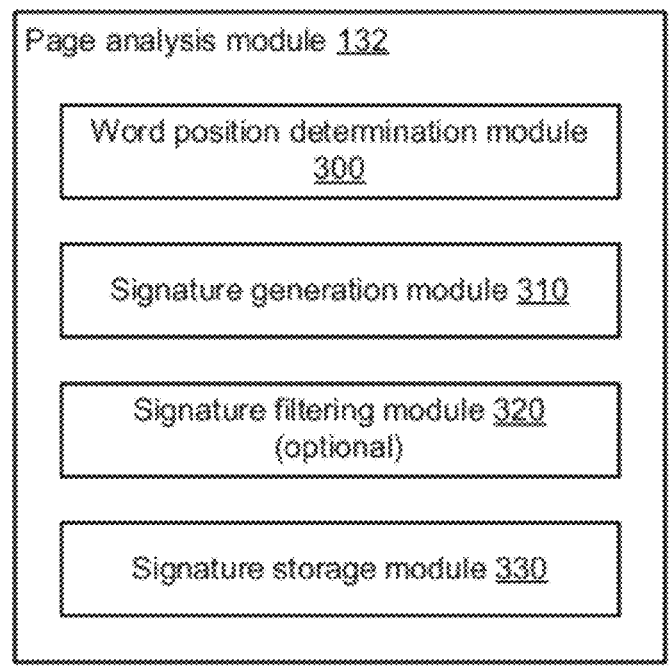
FIG. 3 is a high-level block diagram illustrating a detailed view of the page analysis module, according to one embodiment.

FIG. 3 is a high-level block diagram illustrating a detailed view of the page analysis module 132, according to one embodiment. The page analysis module 132 includes a word position determination module 300, a signature generation module 310, a signature filtering module 320, and a signature storage module 330. The word position determination module 300 determines positions of words within a text page. The signature generation module 310 generates a set of signatures for words within the text page. The signature filtering module 320 (which is optional) removes some of the signatures from the generated set. The signature storage module 320 stores a set of signatures in the repository 120. This set of signatures can then be used to compare the text page to another text page.

The word position determination module 300 determines positions of words within a text page. Specifically, the word position determination module 300 determines individual point locations (one point location per word within the text page). In one embodiment, the position of a word is based on the image of that word. Specifically, the word is represented by one or more "connected components" in the image (e.g., a string of symbols containing no spaces). In this embodiment, the word position determination module 300 performs morphological operations to extract the connected components (representing words) from the text image (where the image is part of the raw page data 122 within the repository 120). Before the connected components are extracted, it can be helpful to perform various image processing steps on the text image, such as conversion of the raw image to grayscale, background normalization, binarization, and deskewing. Small connected components, which usually represent punctuation marks, can generate noise. In one embodiment, these components are filtered out (e.g., by generating a histogram of bounding box sizes and implementing a size cutoff based on the histrogram). In some cases, a punctuation mark merges with a word during the connected components analysis and is therefore not susceptible to being removed.

In another embodiment, the position of a word is based on the bounding box containing that word (where the bounding box information is part of the raw page data 122 within the repository 120).

Once the location of a word is known (e.g., the location of either connected components representing the word or a bounding box containing the word), a single point is determined to represent that word's position. In one embodiment, the single point is centrally-located relative to the word (e.g., at the centroid of the connected components or at the center of the bounding box). In another embodiment, the single point is consistently-located relative to the word but not centrally-located (e.g., at the upper-left corner of the connected components or at the upper-left corner of the bounding box). Note that if the raw page data 122 includes bounding box information for a particular text page, then the positions of words on that page can be determined even if the actual words on the page are not known.

The signature generation module 310 generates a set of signatures for words within the text page. Recall that a signature is a value that describes the positions of various words on a text page. A signature is associated with a particular word position on the text page and describes the positions of various words that are near the particular word position. The positions of the words are the individual point locations determined by the word position determination module 300.

Since one text page includes multiple words at various positions, the signature generation module 310 generates multiple signatures for one text page (e.g., one signature per word position). In one embodiment, the signature generation module 310 generates exactly one signature for each word position on the text page. In another embodiment, the signature generation module 310 can generate two or more signatures for one word position on the text page. Together, the signatures for the word positions on one text page form a set of signatures. Signature generation, including how the value is determined (and how many signatures are generated for one word position), will be discussed below with reference to FIG. 6.

The signature filtering module 320 removes some of the signatures from the set of signatures generated by the signature generation module 310, thereby refining the set of signatures. Specifically, the signature filtering module 320 identifies signatures within the set of signatures that are not unique. If a signature is not unique, then that signature occurs multiple times within the set of signatures (e.g., one occurrence for a first word position and another occurrence for a second word position). Since the $J_s$ similarity is calculated based on counted signatures, duplicate signatures can lead to false positives when performing page comparisons. To address this problem, the signature filtering module 320 removes all instances of non-unique signatures from the set.

Figure 7:
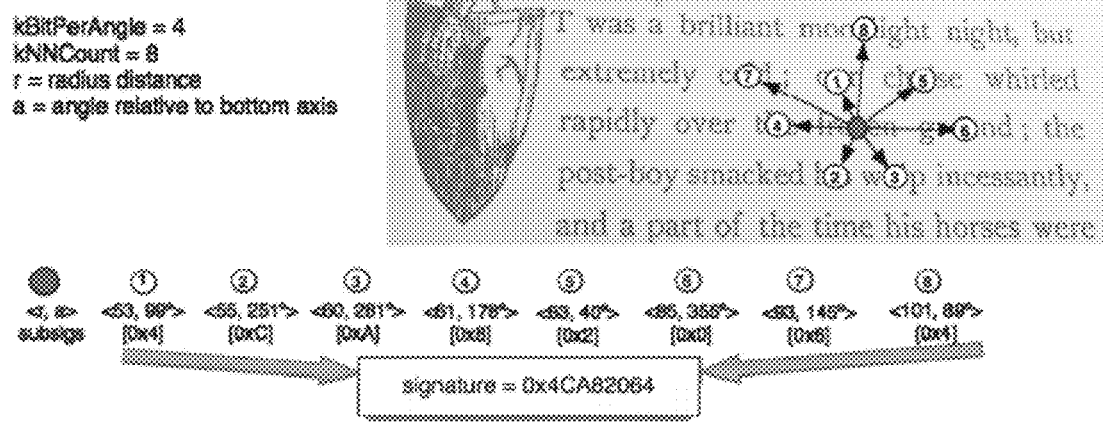
FIG. 7 is a conceptual diagram of a word within a text page and the word's signature according to one embodiment.

Note that the filtering performed by the signature filtering module 320 is different from the filtering described below after FIGS. 6 and 7. The filtering described below after FIGS. 6 and 7 concerns ambiguous signatures and is performed for one signature at a time. The filtering performed by the signature filtering module 320 concerns non-unique signatures and is performed for one set of signatures at a time. The signature filtering module 320 is optional.

The signature storage module 320 stores a set of signatures in the repository 120 as page analysis data 124. This set of signatures is either the set of signatures generated by the signature generation module 310 or the filtered set of signatures (after processing by the signature filtering module 320, which is optional). The set of signatures can then be used to compare the text page to another text page.

Figure 4:
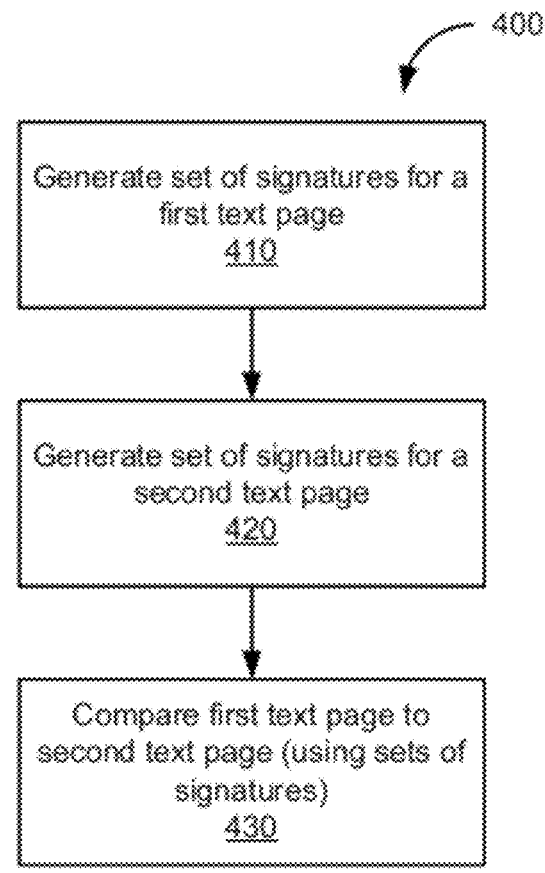
FIG. 4 is a flowchart illustrating a method of comparing text pages according to one embodiment.

FIG. 4 is a flowchart illustrating a method 400 of comparing text pages according to one embodiment. Other embodiments can perform the steps in different orders and can include different and/or additional steps. In addition, some or all of the steps can be performed by entities other than those shown in FIG. 1.

When the method 400 starts, information regarding a first page of text and information regarding a second page of text have already been stored as raw page data 122 in the repository 120.

In step 410, a set of signatures is generated for the first text page. For example, the page analysis module 132 performs step 410. Step 410 will be discussed below with reference to FIG. 5.

In step 420, a set of signatures is generated for the second text page. For example, the page analysis module 132 performs step 420. Step 420 will be discussed below with reference to FIG. 5.

In step 430, the first text page is compared to the second text page. For example, the page comparison module 134 takes as input the first set of signatures associated with the first text page and the second set of signatures associated with the second text page and outputs a measure of similarity between the first text page and second text page.

FIG. 5 is a flowchart illustrating a method 500 of analyzing a text page according to one embodiment. Other embodiments can perform the steps in different orders and can include different and/or additional steps. In addition, some or all of the steps can be performed by entities other than those shown in FIG. 1.

Method 500 corresponds to step 410 in method 400 (with respect to a first text page) and step 420 in method 400 (with respect to a second text page). When the method 500 starts, information regarding a text page has already been stored as raw page data 122 in the repository 120.

In step 510, word positions are determined for the words within the text page. For example, the word position determination module 300 determines individual point locations (one point location per word within the text page).

In step 520, signatures are generated for the text page. For example, the signature generation module 310 generates a set of signatures for the text page. Step 520 will be discussed below with reference to FIG. 6.

In step 530, the signatures generated in step 520 are filtered. For example, the signature filtering module 320 removes some of the signatures from the set of signatures generated in step 520. Step 530 is optional.

In step 540, signatures for the text page are stored. For example, the signature storage module 320 stores a set of signatures in the repository 120 as page analysis data 124. This set of signatures is either the set of signatures generated in step 520 or the filtered set of signatures (generated in step 530, which is optional).

FIG. 6 is a flowchart illustrating a method 600 of generating a signature for a word within a text page according to one embodiment. Other embodiments can perform the steps in different orders and can include different and/or additional steps. In addition, some or all of the steps can be performed by entities other than those shown in FIG. 1. FIG. 7 is a conceptual diagram of a word within a text page and the word's signature according to one embodiment. FIGS. 6 and 7 will be discussed together.

Method 600 corresponds to step 520 in method 500. When the method 600 starts, individual point locations (one point location per word within the text page) have already been determined (e.g., by the word position determination module 300). Also, a particular word location within the text page has been designated as the "focus word." The focus word is the word for which the signature is being generated in method 600. FIG. 7 shows a portion of a text page from "Christmas Eve" within "The Sketch Book of Geoffrey Crayon, Gent, (Volume II)" by Washington Irving. The text page shows point locations for nine words.

In step 610, the N words (N=1, 2, 3, . . . ) closest to the focus word are determined. In FIG. 7, the designated word is "frozen," and its location is marked by a solid circle. N is referred to as "kNNCount" ("NN" meaning "nearest-neighbor") and equals 8. So, the 8 words closest to the focus word ("frozen") are determined. These 8 words ("our," "his," "whip," "the," "chaise," "ground," "cold," "moonlight") have their locations marked by white circles containing the numbers 1, 2, 3, etc.

In step 620, the N distances between the focus word and the N closest words are determined. Specifically, the N Euclidean distances between the point location of the focus word and the point locations of the N closest words are determined. In FIG. 7, this distance is referred to as the "radius distance." The radius distance between the focus word ("frozen") and word 1 ("our") is 53, the radius distance between the focus word ("frozen") and word 2 ("his") is 55, etc. The distance between two words can be measured using any unit, since a distance is used relative to other distances (see step 640) and not in absolute terms. In one embodiment, the unit of measurement for a distance is pixels at 300 ppi (pixels per inch).

In step 630, the N angles between the focus word and the N closest words are determined. In FIG. 7, this angle is referred to as the "angle relative to bottom axis." The angle between the focus word ("frozen") and word 1 ("our") is 99°, the angle between the focus word ("frozen") and word 2 ("his") is 251°, etc.

In step 640, the N calculated angles are ordered based on the N calculated distances. In FIG. 7, word 1 has the shortest calculated distance, word 2 has the second-shortest calculated distance, etc. The calculated angle corresponding to word 1 is 99°, the calculated angle corresponding to word 2 is 251°, etc. The bottom portion of FIG. 7 shows the <calculated distance, calculated angle> pairs for the words 1-8, ordered based on the calculated distances. The pairs show the calculated angles in base-10 format, such that there are 360 possible angle values (0° to 359°).

In step 650, the N ordered calculated angles are concatenated to form the signature. In one embodiment, the calculated angles are discretized before being concatenated. In FIG. 7, the calculated angles are discretized into 16 possible values, each representing a 22.5° range (16×22.5°=360°). Since there are 16 possible values, each calculated angle can be represented by 4 bits of information (represented in FIG. 7 by "kBitPerAngle"). Four bits of information can be represented by one symbol in hexadecimal format ("0x . . . "), which is base-16. In FIG. 7, below the <calculated distance, calculated angle> pairs, the calculated angles are shown in hexadecimal format. The calculated angle corresponding to word 1 is 0x4, the calculated angle corresponding to word 2 is 0xC, etc. The calculated angles in hexadecimal format are concatenated to form the signature. In FIG. 7, the signature for the focus word ("frozen") is the hexadecimal value 0x4CA82064.

Identifying Ambiguous Signatures—In one embodiment, after a signature is generated using method 600, a determination is made regarding whether the signature is "ambiguous." If the signature is determined to be ambiguous, then the ambiguous signature is either filtered out (i.e., discarded) or a second signature is generated based on the ambiguous signature (discussed below). If a second signature is generated, then both the ambiguous signature and the second signature are used in the set of signatures describing the text page.

A signature describes the positions of various words on a text page. Thus, a slight change in a text page (e.g., due to an imperfect scanning process) can lead to changes in word positions and, therefore, changes in signatures. One type of signature change is the ordering of the calculated angles, which is based on the calculated distances (step 640). Another type of signature change is the discretization of the calculated angles prior to concatenation (step 650). In other words, a slight shift in word position can cause calculated angles to be ordered differently (due to different calculated angles) and/or discretized differently, resulting in different signatures.

As explained above in step 650, a signature is a concatenation of angle values. Using mathematical notation, a signature S is composed of smaller sub-signatures S=[s(0)][s(1)] . . . [s(N)]. Signature variations can be caused by slight shifts of word positions. Small shifts can lead to changes in discretized angle value (e.g., s(0) flipping from 13 to 14 due to small word position shifts) or in the order of sub-signatures (e.g., s(0) and s(1) swapping, if they have almost the same distances). In one embodiment, a signature is determined to be "ambiguous" if the signature has a high probability of its concatenated angles flipping over discretization boundaries and/or swapping places in the ordering.

In determining the probability of a discretized angle flipping, if angle α has a discrete value a, where a≦α<a+1, then the distance of a from the discretization edge is $\epsilon=|\alpha-(a+0.5)|$ assuming that a+0.5 is the edge of discretization. If $\epsilon=0$, then a random perturbation of word position points will lead to a flip in 50% of the cases. If the probability of flip is $p(\epsilon)$, then the probability that the entire signature changes due to at least one sub-signature flipping can be expressed as:

$$P_{flip}=1-\Pi_{i=1}^{N}(1-p(\epsilon_i)) \quad (3)$$

Similarly, the probability of two neighboring points swapping positions in a signature is $p(\delta r)$, where $\delta r=|r_1-r_2|/(\frac{1}{2}(|r_1|+|r_2|))$ is the relative distance between consecutive neighbor points from the chosen (focus) point. The probability that the signature changes can be expressed as:

$$P_{swap}=1-\prod_{i=1}^{N-1}\left(1-p\left(\frac{|r_i-r_{i+1}|}{\frac{1}{2}(|r_i|+|r_{i+1}|)}\right)\right) \quad (4)$$

Finally, the probability of a signature changing due to swap or flip is $P_{flip\_or\_swap}=1-(1-P_{flip})\times(1-P_{swap})$. The probability distribution can be naively modeled as $p(x,w)=0.5\times(w-x)$ if $x \in [0,w)$ and 0 otherwise. x is variable, while w is a threshold parameter. For angular discretization, $w_{angle}=0.05$. For radius distance risk, $w_{radius}=0.01$. A signature is determined to be ambiguous if $P_{flip\_or\_swap}>0.6$.

Generating a second signature—If a signature is determined to be ambiguous, then the ambiguous signature is either filtered out (i.e., discarded) or a second signature is generated based on the ambiguous signature. The generated signature corresponds to how the ambiguous signature would change if the ambiguous signature experienced a flip or swap.

In the instance of angle discretization (angle flipping), a calculated angle often ends up on one side or the other of a discretization edge in the discretization function. When this happens, both discretized values can be used—one discretized value to generate a first signature, and the other discretized value to generate a second signature. A signature can be considered to be a superposition of states (angles) and, by calculating the signature, mixtures are projected to their discrete values. But it is also possible to create all possible projections (i.e., the set of all signatures).

For example, if the first and third sub-signatures have two possible states, then there are four possible signatures. For example, $[\{s_1, s_1'\}][s_2][\{s_3, s_3'\}][s_4]$ would lead to $\{[s_1][s_2][s_3][s_4], [s_1'][s_2][s_3][s_4], [s_1][s_2][s_3'][s_4], [s_1'][s_2][s_3'][s_4]\}$. In one embodiment, superposition is performed (i.e., an additional signature is generated) when a calculated angle falls within $\epsilon<0.05$ of a discretization edge.

The problem of angle swapping is similar. Here, when the difference between two calculated distances falls within a particular range, superposition is performed (i.e., an additional signature is generated). The additional signature swaps the relevant angles in the ambiguous signature.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of generating a signature for a page of text, wherein the signature serves as an identifier of the text page, comprising:
   determining positions of a plurality of words in the text page;
   for a first word of the plurality of words having a first position in the text page, determining positions of a plurality of second words in the text page relative to the first word position;
   generating a signature value that describes the second word positions relative to the first word position;
   generating additional signature values for the text page, each signature value describing positions of other words in the text page relative to a word in the text page for which the signature value is being generated;
   comparing a first set of signature values for the text page to a second set of signature values for a second text page, wherein the first set of signature values comprises the signature value that describes the second word positions relative to the first word position and the additional signature values;

generating a measure of similarity that describes a result of the comparison; and storing the similarity measure on a non-transitory computer-readable storage medium.

2. The computer-implemented method of claim 1, wherein determining a position of a word in the text page comprises extracting connected components representing the word from the text page.

3. The computer-implemented method of claim 2, wherein determining the position of the word in the text page further comprises determining a centroid of the extracted connected components.

4. The computer-implemented method of claim 1, wherein determining a position of a word in the text page comprises determining a bounding box containing the word.

5. The computer-implemented method of claim 4, wherein determining the position of the word in the text page further comprises determining a center of the bounding box.

6. The computer-implemented method of claim 1, wherein generating the signature value that describes the second word positions relative to the first word position comprises calculating, for second word positions within the plurality of second word positions, a distance between the first word position and the second word position.

7. The computer-implemented method of claim 1, wherein generating the signature value that describes the second word positions relative to the first word position comprises calculating, for second word positions within the plurality of second word positions, an angle between the first word position and the second word position.

8. The computer-implemented method of claim 7, wherein generating the signature value that describes the second word positions relative to the first word position further comprises:
concatenating the calculated angles; and
ordering the calculated angles prior to concatenation.

9. The computer-implemented method of claim 7, wherein generating the signature value that describes the second word positions relative to the first word position further comprises:
concatenating the calculated angles; and
discretizing the calculated angles prior to concatenation.

10. The computer-implemented method of claim 1, wherein comparing the first set of signature values to the second set of signature values comprises determining an intersection of the first set of signature values and the second set of signature values.

11. The computer-implemented method of claim 1, wherein comparing the first set of signature values to the second set of signature values comprises determining a union of the first set of signature values and the second set of signature values.

12. The computer-implemented method of claim 1, wherein the similarity measure comprises Jaccard similarity.

13. A non-transitory computer-readable storage medium storing executable computer program instructions for generating a signature for a page of text, wherein the signature serves as an identifier of the text page, the instructions performing steps comprising:
determining positions of a plurality of words in the text page;
for a first word of the plurality of words having a first position in the text page, determining positions of a plurality of second words in the text page relative to the first word position;
generating a signature value that describes the second word positions relative to the first word position;
generating additional signature values for the text page, each signature value describing positions of other words in the text page relative to a word in the text page for which the signature value is being generated;
comparing a first set of signature values for the text page to a second set of signature values for a second text page, wherein the first set of signature values comprises the signature value that describes the second word positions relative to the first word position and the additional signature values; and
generating a measure of similarity that describes a result of the comparison.

14. The computer-readable storage medium of claim 13, wherein generating the signature value that describes the second word positions relative to the first word position comprises calculating, for second word positions within the plurality of second word positions, a distance between the first word position and the second word position.

15. The computer-readable storage medium of claim 13, wherein generating the signature value that describes the second word positions relative to the first word position comprises calculating, for second word positions within the plurality of second word positions, an angle between the first word position and the second word position.

16. A computer system for generating a signature for a page of text, wherein the signature serves as an identifier of the text page, comprising:
at least one non-transitory computer-readable storage medium storing executable computer program instructions comprising instructions for:
determining positions of a plurality of words in the text page;
for a first word of the plurality of words having a first position in the text page, determining positions of a plurality of second words in the text page relative to the first word position;
generating a signature value that describes the second word positions relative to the first word position;
generating additional signature values for the text page, each signature value describing positions of other words in the text page relative to a word in the text page for which the signature value is being generated;
comparing a first set of signature values for the text page to a second set of signature values for a second text page, wherein the first set of signature values comprises the signature value that describes the second word positions relative to the first word position and the additional signature values; and
generating a measure of similarity that describes a result of the comparison; and
a processor for executing the computer program instructions.

17. The computer system of claim 16, wherein generating the signature value that describes the second word positions relative to the first word position comprises calculating, for second word positions within the plurality of second word positions, an angle between the first word position and the second word position.

18. The computer-readable storage medium of claim 13, wherein comparing the first set of signature values to the second set of signature values comprises determining an intersection of the first set of signature values and the second set of signature values.

19. The computer-readable storage medium of claim 13, wherein comparing the first set of signature values to the second set of signature values comprises determining a union of the first set of signature values and the second set of signature values.

20. The computer-readable storage medium of claim 13, wherein the similarity measure comprises Jaccard similarity.

* * * * *